United States Patent [19]

Stevenson

[11] Patent Number: 4,714,637
[45] Date of Patent: Dec. 22, 1987

[54] RADIANT HEAT RESISTANT STENCILIBLE INFLATABLE AND METHOD

[75] Inventor: Hildreth W. Stevenson, Medina, Ohio

[73] Assignee: The B. F. Goodrich Company, Akron, Ohio

[21] Appl. No.: 866,533

[22] Filed: May 23, 1986

[51] Int. Cl.⁴ .............................................. B32B 3/06
[52] U.S. Cl. ..................................... 428/35; 427/261;
427/404; 427/405; 428/196; 428/252; 428/263;
428/921
[58] Field of Search ................. 428/252, 263, 35, 196,
428/921; 427/261, 404, 405, 412

[56] References Cited

U.S. PATENT DOCUMENTS 4,671,975  6/1987  Smialowicz ........................... 428/35

Primary Examiner—Marion C. McCamish
Attorney, Agent, or Firm—Woodrow W. Ban

[57] ABSTRACT

A zone on an aluminum coated heat resistant inflatable structure in which sufficient aluminum paint is applied to the structure whereby upon stenciling, the radient heat resistance capabilities of the inflatable air structure are not unacceptably diminished as a result of the presence of stenciling of the air structure.

4 Claims, 1 Drawing Figure

RADIANT HEAT RESISTANT STENCILIBLE INFLATABLE AND METHOD

FIELD OF THE INVENTION

The present invention relates to inflatable fabric structures and more particularly to inflatable fabric structures resistant for a desired period of time to an elevated level of radiant heat. More specifically, this invention relates to inflatable aircraft escape slides and to methods and structures for applying stenciling to such escape slides.

BACKGROUND OF THE INVENTION

Inflatables have found use in industry in a wide variety of functions. In some such functions, such as in aircraft escape slides, it is necessary that the inflatable be resistant to substantial quantities of radiant heat for a time period sufficient for the inflatable to perform its intended function. For inflatable evacuation slides such as may be employed in evacuating an aircraft or other escape structure, the time period for which predetermined quantities of radiant heat must be tolerated by the air slide are typically by administrative regulation such as is set forth in Federal Aviation Administration (FAA) regulations and standards, and particularly in FAA/TSO-69A Appendix II. Exposure to intense radient heat can cause deflation as a result of the premature formation of holes.

Traditionally, inflatables are formed of one or more plies of fabric defining an inflatable chamber. An inner surface of the plies of fabric typically is formed of a substance having the properties of retaining air within the inflatable such as a urethane coating or Neoprene ® rubber coating. An outer surface of the inflatable structure typically is coated with an aluminum rich substance, at least where radiant heat resistance is mandated. The resulting aluminum rich coating functions to reflect away a substantial portion of radiant heat impinging upon the inflatable structure and thereby provides protection against the radiant heat. In zones of high wear or great stress, a plurality of fabric plies typically can be employed. Again, the innermost ply includes an inner air retaining urethane layer and the outer surface of the multitude of plies is coated with an aluminum rich substance for radiant heat protection.

Inflatable structures often are employed for emergency evacuation purposes such as in forming evacuation slides for aircraft. It is important in such uses that instructions on such slides be highly visible and easily located as, frequently, these instructions must be read and understood in times of great duress. The point at which such instructions are required varies from inflatable structure to inflatable structure and is in part a function of the use to which the structure is put.

Whether these instructions have been placed on a signage substrate fastened or adhered to the inflatable structure in some manner, or whether these instructions have been stenciled directly onto the inflatable, the application of instructions traditionally has negatively influenced the radiant heat resistance of the inflatable structure. Fastening members employed to fasten a substrate bearing the instructions to the inflatable member have functioned to conduct heat to the inflatable causing premature leakage. The substrates themselves can cause heating of the air inflatable due to the absorption of radiant heat by the substrate and subsequent transfer to the inflatable member and lead to premature inflatable failure.

In past suggestions, the substrate bearing a legend was fixed to the air inflatable and formed from a reflective substance such as aluminum foil. Such reflective substrates can be difficult to adhere to an inflatable and can become damaged during folding of an inflatable for storage.

In past suggestions, where stenciling was applied directly to the inflatable, the ink with which such direct stenciling has been accomplished upon an inflatable has included a substantial proportion of aluminum thereby producing a paint configured to reflect a great amount of radiant heat and slow the process by which radiant heat produces holes and thereby an air loss in the air inflatable. Such aluminum containing paints have proved difficult to view under many lighting conditions and have been less highly visible than would be desired particularly in flickening light such as may result from a fire.

Accordingly, a means for direct stenciling on an inflatable employing highly visible colors while still permitting a radiant heat rejection sufficient to qualify the inflatables for uses such as in escape slides for aircraft could find substantial commercial utility.

SUMMARY OF THE INVENTION

The present invention provides a method and means for applying stenciling to a heat resistant inflatable structure. Heat resistant inflatable structures made in accordance with the invention include a stenciling zone of at least one ply of structural fabric having an aluminum coating thereover and at least one thickness of an aluminum paint thereover. The aluminum paint is possessed of an aluminum content at least sufficient in the number of coats applied over the structural fabric to preclude for ninety seconds air loss from the inflatable air structure as a result of heat damage attributable to stenciling applied thereof when such stenciled resilient inflatable air structure is tested in accordance with FAA/TSO-69A, Appendix II.

Stenciling is accomplished upon heat resistant inflatable structures in accordance with the invention by applying to the inflatable structure at least one coating of aluminum paint, the number of coatings being applied having an aluminum content in the sum of the coatings at least sufficient to preclude for ninety seconds air loss as a result of heat damage from stenciling applied over the aluminum paint when tested in accordance with FAA/TSO-69A, Appendix II. The resilient heat resistant inflatable structure is then stenciled.

The above and other features will become more apparent when considered in light of the drawings and a description of the preferred embodiment that follows, together forming a part of the specification.

BEST EMBODIMENT OF THE INVENTION

Figure 1:
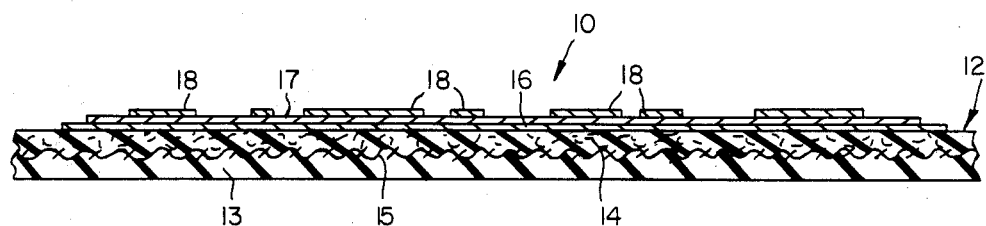
FIG. 1 is a partial cross-sectional view of a heat resistant inflatable structure in accordance with the invention.

Referring to the drawing, FIG. 1 is a fragmentary representation in cross section of a heat resistant inflatable structure 10 made in accordance with the invention. The structure 10 includes a fabric ply 12 including a lower surface 13 having generally air impermeable properties. The lower surface 13 may be formed of a urethane or an air impervious rubber such as Neoprene ®. The fabric ply 12 includes an upper or outer coating 14 rich in aluminum and configured for reflecting heat. The fabric ply includes a mesh element 15 formed of any suitable or conventional high melting temperature fiber such as nylon or Kevlar ®.

The air impervious coating 13 frequently penetrates the fabric mesh 15 to provide a filled or partially filled fabric ply structure. Fabric plies 12 such as are shown in FIG. 1 are readily commercially available. Typically, a fabric ply is a single ply formed of four ounce nylon fabric coated on the inside with an air retaining urethane or Neoprene material and on the outside with an aluminum filled urethane coating or an aluminum filled Neoprene coating.

Applied to the aluminumized surface 14 are two paint coatings, 16, 17. These aluminum coatings 16, 17 can be of any suitable or conventional nature such as may be obtained by applying aluminum paint. A suitable aluminum paint as may be employed in the practice of the invention is KE7620 obtained from The B F Goodrich Company. The quantity of aluminum applied in the coating 16, 17 must cumulatively be sufficient to provide radiant heat protection to the fabric ply 12 notwithstanding stenciling thereover.

Stenciling 18 is then applied over the aluminum paint. The stenciling can be of any suitable or conventional nature and such inks are readily commercially available.

The fabric ply 12 and aluminum paint coatings 16,17 together define a zone suitable for stenciling upon the inflatable. It should be understood that the zone may include a plurality of fabric plies 12. In the event that a plurality of fabric plies are employed, only the outermost fabric ply need be coated with aluminum. Multiple plies may be inter-adhered employing suitable or conventional well known techniques.

The zone means of the present invention for stenciling has advantages over systems requiring the application of a patch or other labeling device. Particularly rapid application of aluminum paint to the inflatable may be accomplished in the field employing spray techniques, and stenciling may then be accomplished immediately after drying of the aluminum paint overcoatings.

The quantity of aluminum paint applied to the heat resistant inflatable structure should be sufficient to, after stenciling, enable the air structure to pass the FAA/TSO-69A, Appendix II test standard of ninety seconds in a radiant heat environment for inflatable air structures intended for use in fabricating escape slides for aircraft.

In the practice of the instant invention, typically two coats of aluminum paint are required to achieve a radient heat resistance beneath any stenciling sufficient to pass the FAA/TSO. Employing the plurality of coats of aluminum paint of the invention, bright stenciling employing inks or paints undiluted with a dulling aluminum pigmentation can be employed without substantially interfering with the heat resistance of the inflatable air structure and while providing substantially enhanced readability of the stenciling.

While a preferred embodiment of the invention has been shown or described in detail, it should be understood that various modifications may be made thereto without departing from the scope of the claims that follows.

What is claimed is:

1. In a radiant heat resistant inflatable structure, a stenciling zone comprising: at least one ply of a structural fabric integral with a structural fabric ply of the inflatable structure having one aluminum coating thereover, and at least one thickness of an aluminum paint thereover, the aluminum paint having an aluminum content at least sufficient in the number of coats applied over the structural fabric to preclude for 90 seconds air loss as a result of heat damage from stenciling applied thereover when tested in accordance with FAA/TSO-69A, Appendix II.

2. In a radiant heat resistant inflatable air structure formed of at least one ply of a structural fabric and having an aluminum coating thereover, a method for stenciling the structure comprising the steps of: (i) applying to the surface of the structural fabric to be stenciled at least one thickness of an aluminum paint having an aluminum content at least sufficient in the number of coated applied to preclude for 90 seconds air loss as a result of heat damage from stenciling applied over the aluminum paint when tested in accordance with FAA/TSO-69A, Appendix II; and (ii) stenciling thereover.

3. The zone of claim 1, the heat resistant inflatable air structure being an aircraft escape slide.

4. The method of claim 2, the heat resistant inflatable air structure being an aircraft escape slide.

* * * * *